US008564723B2

(12) United States Patent
Nakajima

(10) Patent No.: US 8,564,723 B2
(45) Date of Patent: Oct. 22, 2013

(54) COMMUNICATION SYSTEM, COMMUNICATION METHOD, VIDEO OUTPUT APPARATUS AND VIDEO INPUT APPARATUS

(75) Inventor: Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 1618 days.

(21) Appl. No.: 11/801,122

(22) Filed: May 8, 2007

(65) Prior Publication Data

US 2007/0277216 A1 Nov. 29, 2007

(30) Foreign Application Priority Data

May 16, 2006 (JP) ................ P2006-136916

(51) Int. Cl.
*H04N 5/52* (2006.01)
*H04N 5/44* (2011.01)
*H04N 5/50* (2006.01)

(52) U.S. Cl.
USPC ............................ 348/552; 348/553; 348/569

(58) Field of Classification Search
USPC .................................. 348/552, 553, 554, 569
See application file for complete search history.

(56) References Cited

U.S. PATENT DOCUMENTS

| 5,708,475 | A | 1/1998 | Hayashi et al. | |
|---|---|---|---|---|
| 6,914,637 | B1 | 7/2005 | Wolf et al. | |
| 7,414,670 | B2 * | 8/2008 | Takamori et al. | 348/441 |
| 7,466,363 | B2 * | 12/2008 | Shimozawa et al. | 348/569 |
| 7,554,614 | B2 * | 6/2009 | Satou | 348/734 |
| 7,583,319 | B2 * | 9/2009 | Ukai et al. | 348/515 |
| 7,979,590 | B2 * | 7/2011 | Lida et al. | 710/2 |
| 8,121,349 | B2 * | 2/2012 | Momosaki | 382/103 |
| 8,130,684 | B2 * | 3/2012 | Funabiki et al. | 370/310 |
| 2003/0223377 | A1 * | 12/2003 | Simmons et al. | 370/254 |
| 2004/0095509 | A1 * | 5/2004 | Okamoto et al. | 348/462 |
| 2005/0216944 | A1 * | 9/2005 | Johnson | 725/115 |
| 2006/0026635 | A1 | 2/2006 | Potrebic et al. | |
| 2006/0048187 | A1 * | 3/2006 | Lubbers et al. | 725/46 |
| 2006/0095402 | A1 * | 5/2006 | Lee et al. | 707/1 |
| 2006/0195879 | A1 * | 8/2006 | Ogasawara | 725/115 |
| 2006/0232707 | A1 * | 10/2006 | Kimura | 348/553 |
| 2006/0250419 | A1 * | 11/2006 | Shiba et al. | 345/619 |
| 2006/0256241 | A1 * | 11/2006 | Suzuki et al. | 348/706 |

(Continued)

FOREIGN PATENT DOCUMENTS

| JP | 2001-339685 | 12/2001 |
|---|---|---|
| JP | 2003-061013 | 2/2003 |

(Continued)

OTHER PUBLICATIONS

European Search Report, EP 07108297, dated Jul. 16, 2010.

*Primary Examiner* — Brian Yenke
(74) *Attorney, Agent, or Firm* — Lerner, David, Littenberg, Krumholz & Mentlik, LLP

(57) ABSTRACT

A communication system may includes a source device to output video contents and a sink device to input the video contents, connected to the source device using a control transmission channel and a video transmission channel through which data is transmitted. The source device may include a first control data I/O unit, a first video data output unit, a video data retention unit, a contents list retention unit, an index image data retention unit and a first control unit. The sink device may include a second control data I/O unit, a second video data input unit, a video processing unit, and a second control unit.

11 Claims, 8 Drawing Sheets

(56) References Cited

U.S. PATENT DOCUMENTS

| | | |
|---|---|---|
| 2007/0011720 A1* | 1/2007 | Min .............................. 725/151 |
| 2007/0186015 A1* | 8/2007 | Taft et al. ......................... 710/16 |
| 2009/0051565 A1* | 2/2009 | Yung et al. ............... 340/825.22 |
| 2009/0141180 A1* | 6/2009 | Kondo et al. .................. 348/723 |
| 2009/0174817 A1* | 7/2009 | Sato et al. ..................... 348/554 |
| 2010/0026790 A1* | 2/2010 | Ohba et al. ...................... 348/51 |
| 2010/0269137 A1* | 10/2010 | Nakajima et al. ............... 725/39 |

FOREIGN PATENT DOCUMENTS

| | | |
|---|---|---|
| JP | 2005-514873 | 5/2005 |
| WO | WO-02/078336 A1 | 10/2002 |
| WO | 03096695 A1 | 11/2003 |
| WO | 2005057920 A1 | 6/2005 |
| WO | 2005122564 A1 | 12/2005 |
| WO | 2006030958 A1 | 3/2006 |

\* cited by examiner

FIG. 7

| Address | Device |
|---|---|
| 0 | TV |
| 1 | Recording Device 1 |
| 2 | Recording Device 2 |
| 3 | STB1 |
| 4 | DVD1 |
| 5 | Audio |
| 6 | STB2 |
| 7 | STB3 |
| 8 | DVD2 |
| 9 | Recording Device 3 |
| 10 | Video Camera |
| 11 | Not Defined |
| 12 | Not Defined |
| 13 | Not Defined |
| 14 | Free Use |
| 15 | Broadcast |

FIG. 8

| Operation Code | Response | Content |
|---|---|---|
| <give Contents List> | <set Contents Number> | Contents List Request |
| <set Contents Number> | None | Number of Contents |
| <set Contents Info> | None | Contents Information |
| <Thumbnail ID> | None | Thumbnail ID |
| <Play Content> | <Status> | Reproduction Instruction |
| <Image View On> | None | Video Transmission Start |

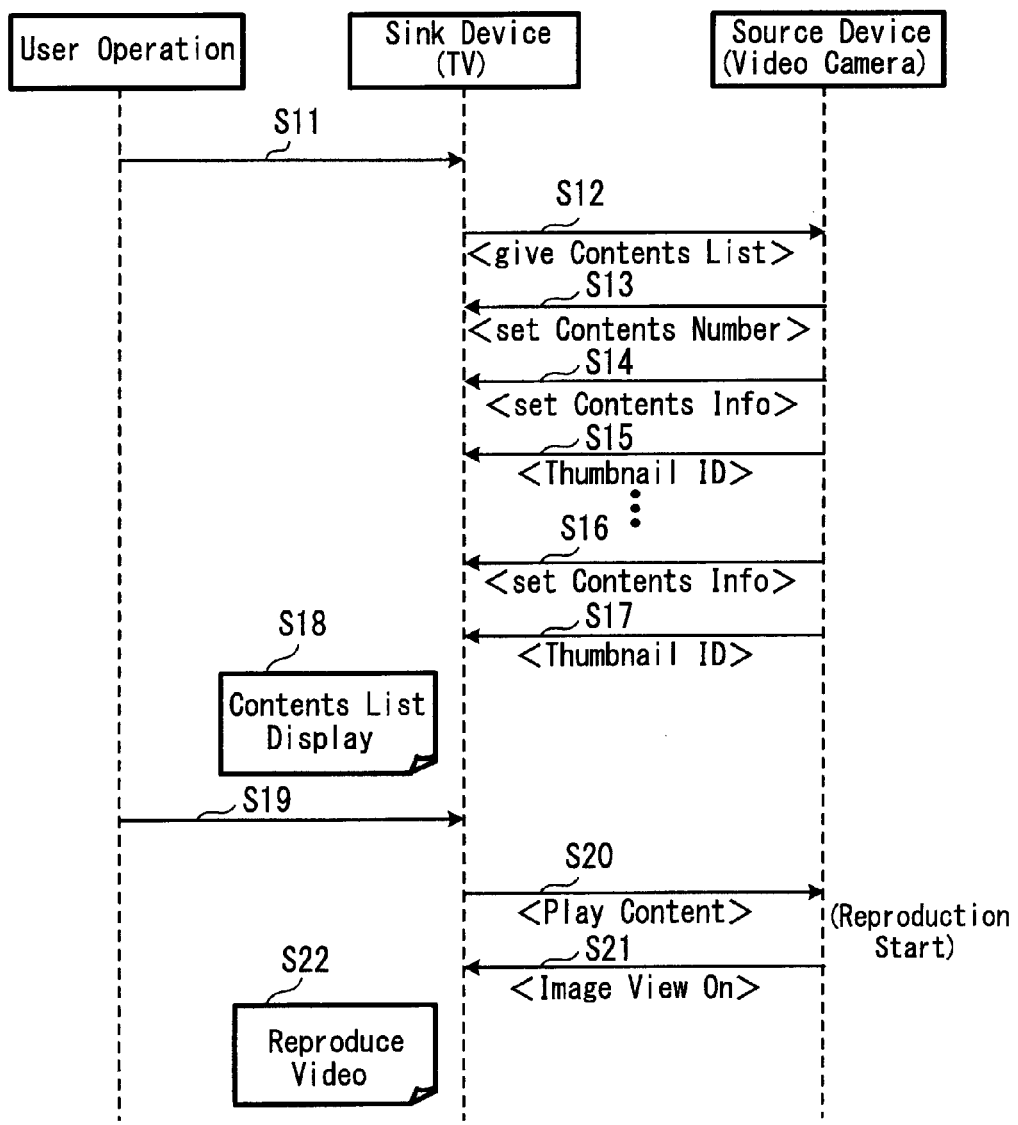

COMMUNICATION SYSTEM, COMMUNICATION METHOD, VIDEO OUTPUT APPARATUS AND VIDEO INPUT APPARATUS

CROSS-REFERENCE TO RELATED APPLICATIONS

This application claims priority from Japanese Patent Application No. JP 2006-136916 filed in the Japanese Patent Office on May 16, 2006, the entire content of which is incorporated herein by reference.

BACKGROUND OF THE INVENTION

1. Field of the Invention

The present invention relates to a communication system and a communication method which are suitable for being applied to a system including a device that performs an input or output in conformity with a digital video/audio I/O interface standard called the HDMI (High-Definition Multimedia Interface) standard, and relates to a video output apparatus and a video input apparatus which are used in the system.

2. Description of the Related Art

Lately, the HDMI standard has been developed as an interface standard to transmit uncompressed digital video data and the like between a plurality of video apparatuses. According to the HDMI standard, video data is transmitted as individual primary color data respectively transmitted by one pixel. In the HDMI standard, audio data is also transmitted using a transmission line for the video data in a blanking period of the video data. Primary color data of red, green and blue (R-data, G-data, and B-data) are transmitted as the primary color data. Luminance and color-difference signals such as Y, Cb and Cr may be transmitted instead of the primary color data.

According to the HDMI standard, one pixel data of respective colors is basically transmitted by eight bits. Synchronization signals such as a horizontal synchronization signal and a vertical synchronization signal are also transmitted at a timing that each synchronization signal is arranged. A video data transmission line using pixel clock and a control data transmission line are provided. Since uncompressed digital video data is transmitted by a pixel as described above, a high definition video data and the like can be transmitted while copyright is protected.

A plurality of video apparatuses such as a video signal source device, for example, a disk reproduction apparatus, and a display apparatus (monitor receiver, television receiver, and the like) are typically connected using the transmission line (HDMI cable) of the HDMI standard. A device that outputs video data and the like to the transmission line of the HDMI standard is called a source device (output apparatus), and a device that inputs the video data and the like via the transmission line of the HDMI standard is called a sink device (input apparatus).

WO2002/078336 discloses a detailed description of the HDMI standard.

SUMMARY OF THE INVENTION

In the case where a television receiver receives video contents from a source device such as a hard disk recorder, typically the television receiver obtains a list of contents which can be output from the source device, displays the obtained contents list so that a user select the content, and performs processing of requesting transmission of the selected content. For example, in the case where the source device is a hard disk recorder, a list (contents list) of recorded programs (video contents) is typically displayed and the user selects the program from the displayed list using a remote controller or the like. In the case of a device such as the hard disk recorder capable of recording broadcast programs, the recording device itself has a function of preparing a contents list and a picture of the prepared list is sent to the television receiver to be displayed.

However, there may be video apparatuses such as a video camera recorder without the function of preparing such display contents list. In the case of such apparatuses being connected to the television receiver at a terminal of the above-described HDMI standard, reproduced video data and audio data alone can be transmitted. Accordingly, if the device is connected to the television receiver, it is difficult to display a list of contents reproduced and to select video reproduced based on the list, using a screen of the television receiver. Further, it is difficult to select the video reproduced based on index image data of respective contents corresponding to the contents list.

It is desirable to perform high level processing such as selecting video displayed, in the case where video apparatuses are mutually connected using a digital video data transmission cable such as the HDMI standard cable.

According to an embodiment of the present invention, a source device to output video contents and a sink device to input the video contents may be connected using a control transmission channel and a video transmission channel, and data may be transmitted through the control transmission channel and the video transmission channel. A list of video contents that can be output from the source device may be transmitted to the sink device via the control transmission channel in response to a request to the source device from the sink device. Simultaneously, index image data of each content in the contents list may be transmitted to the sink device via the video transmission channel in a blanking period of the video data. The contents list and index image transmitted as described above may be displayed on the sink device so that the video content to be transmitted from the source device can be selected.

As a result, the contents list and the index image data may be transmitted from the source device to the sink device using a cable for transmitting the video data from the source device to the sink device, and the list of the video contents that can be input may be displayed together with the index image in the sink device. Information related to the selection of the video content in the contents list may be sent to the source device using the control transmission channel, thereby enabling selection operation based on the displayed contents list to be performed.

According to the embodiment of the present invention, the contents list and the index image prepared in the source device may be transmitted and the list of the video contents may be displayed together with the index image only by connecting the source device and the sink device with the cable for transmitting the video data, thereby enabling various operations using the displayed list and index image to be performed and improving the operability of the video apparatus.

BRIEF DESCRIPTION OF THE DRAWINGS

FIG. 7 is an explanatory diagram showing an example of configuration of a logical address according to an embodiment of the present invention;

FIG. 8 is an explanatory diagram showing an example of configuration of command data according to an embodiment of the present invention;

FIG. 9 is an explanatory diagram showing an example of configuration of a thumbnail data header according to an embodiment of the present invention;

FIG. 10 is a sequence chart showing an example of transmission processing according to an embodiment of the present invention;

DETAILED DESCRIPTION

An embodiment of the present invention is hereinafter explained by referring to the accompanied drawings.

In this embodiment, a plurality of video apparatuses are connected using a transmission line of the HDMI standard, and video contents and the like are transmitted between a video output apparatus (source device) and a video input apparatus (sink device). A video camera recorder is used for the video output apparatus. A television receiver, which is a video display apparatus, is used for the video input apparatus.

Figure 1:
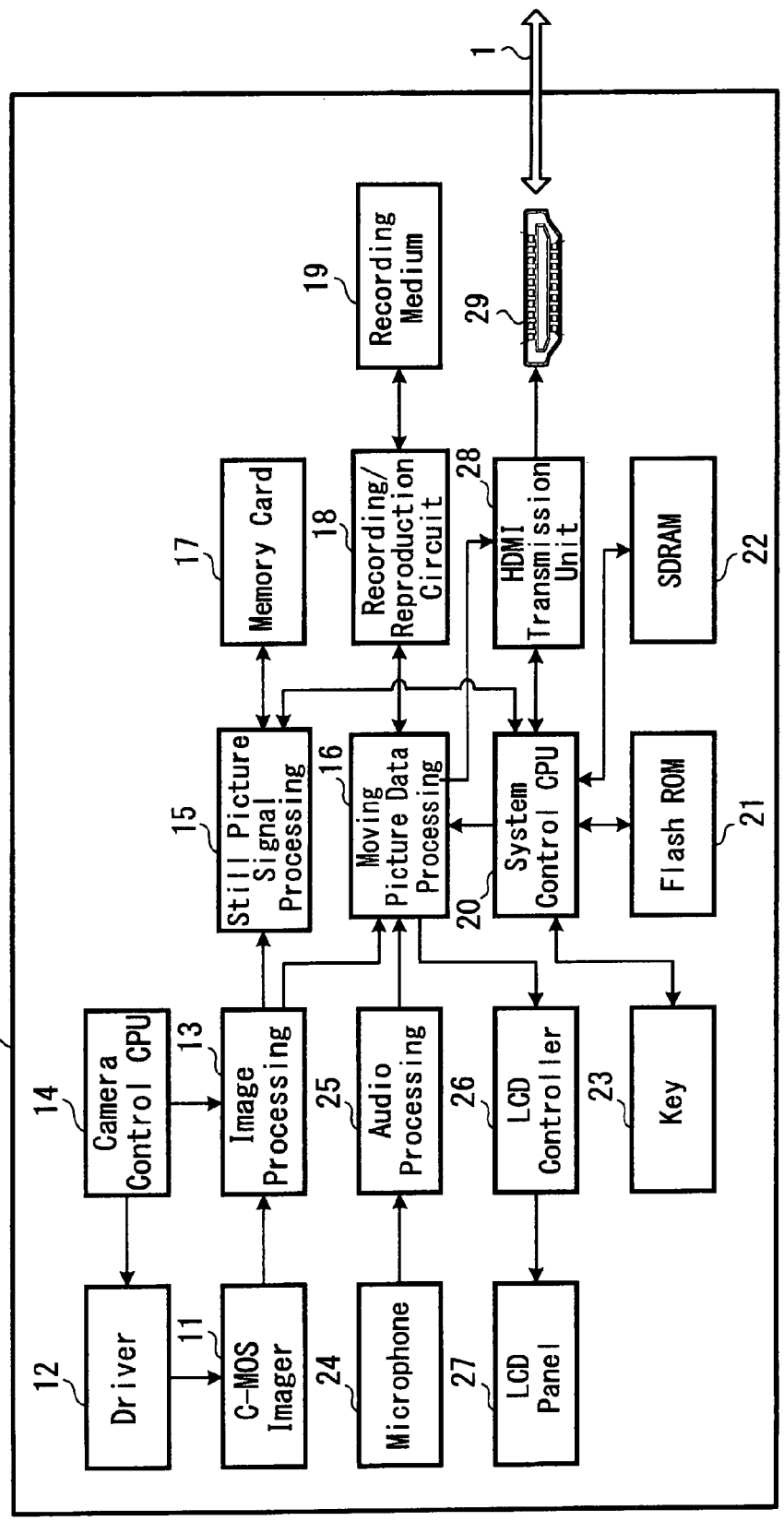
FIG. 1 is a block diagram showing an example of configuration of a source device according to an embodiment of the present invention.

FIG. 1 is a diagram showing an example of configuration of the video camera recorder representing the video output apparatus. A video camera recorder 10 includes a CMOS imager (or CCD imager) 11, a driver 12 which drives the imager to capture images, and an image processing circuit 13 to which an image signal is supplied to perform image signal processing. A camera control CPU 14 controls the imaging in the imager 11 and the processing in the image processing circuit 13.

The image processing circuit 13 processes the image signal and supplies the result to a still picture data processing circuit 15 which processes the image signal to be a still picture signal, and supplies the result to a moving picture data processing circuit 16 which processes the image signal to be moving picture data (video data). The still picture data processing circuit 15 processes the image signal to be still picture data encoded using the JPEG (Joint Photographic Experts Group) method, for example. The still picture data obtained in the still picture data processing circuit 15 is recorded (stored) in a memory card 17. A thumbnail image, which is later-described still picture index data, is also prepared in the still picture data processing circuit 15 and recorded in the memory card 17.

The moving picture data processing circuit 16 performs compression coding using, for example, the MPEG-2 method (Moving Picture Experts Group phase 2 method) to obtain the compression-coded video data. The video data obtained in the moving picture data processing circuit 16 is supplied to a recording/reproduction circuit 18 and recorded in a recording medium 19 loaded in the video camera recorder 10. An optical disk, a hard disk, a magnetic tape, a semiconductor memory and the like, for example, can be used as the recording medium 19. The video data recorded in the recording medium 19 includes additional information such as a title, recording (photographing) date and time, recording time, recording mode, and comment input by a user per video record. Such additional information is used when preparing a list of the recorded video contents. It should be noted that the moving picture video data recorded in the recording medium 19 may be described as a video content in the description below. Video data described as one video content represents, for example, one unit of video program that is recorded at a time from the start to the end, one unit of video program that is obtained by collecting video data recorded in the same day, one unit of video program that is edited and combined, and the like.

Further, the video camera recorder 10 according to the embodiment includes a microphone 24. An audio signal picked up by the microphone 24 is supplied to an audio processing circuit 25 which processes the audio signal into audio data to be recorded. The audio processing circuit 25 outputs the audio data to be supplied to the moving picture data processing circuit 16 which adds the audio data to the video data recorded in the recording medium 19.

A system control CPU 20 controls the processing in the still picture data processing circuit 15 and processing in the moving picture data processing circuit 16. A flash ROM 21 and a SDRAM 22 are connected to the system control CPU 20. A program necessary for the control of the system control CPU 20 and the like are stored in the flash memory 21, and data necessary for control processing is temporarily stored in the SDRAM 22. The memory 21 or 22 are also used to store contents list data that is described later. Thumbnail image data may be stored in the memory 21 or 22.

Further, the system control CPU 20 detects an operation of a key 23 provided in the video camera recorder 10 and controls an operation mode of the video camera recorder 10 into a corresponding state. Using the key 23, the video camera may perform imaging (recording) and reproducing, and further an operation of inputting various additional information and the like.

The captured video data obtained in the moving picture data processing circuit 16, or the video data obtained in the recording/reproduction circuit 18, which is read from the recording medium 19, is supplied to a LCD (Liquid Crystal Display) controller 26 so that the video can be displayed on a LCD panel 27.

The system control CPU 20 performs control on the video data recorded in the recording medium 19 and prepares the contents list indicating data of respective video contents stored in the flash ROM 21 or the SDRAM 22. In addition, at least one index image is prepared and added per video content in the video contents list. Each index image includes ID indicating correspondence to the video content. Here, thumbnail images for displaying a plurality of images which are reduced in size and aligned are used as the index images. Various processing methods known in the past can be employed as the processing method of selecting and preparing the index image (thumbnail image) from each video content. Such a simplified processing method as using an image of the header portion of each video content is employed, for example. The system control CPU 20 controls the prepared contents list and thumbnail images to be displayed on the LCD panel 27.

Further, the video camera recorder 10 according to the embodiment includes a HDMI terminal 29, which is connected to a cable 1 of the HDMI standard, as a terminal for outputting video data. Transmission processing using the HDMI terminal 29 is performed in a HDMI transmission processing circuit 28. Video data supplied from the moving picture data processing circuit 16 is supplied to the HDMI transmission processing circuit 28 to be output from the HDMI terminal 29. The output video data is sent to the cable 1 as the video data conforming to a format of the HDMI standard. The video data output from the HDMI terminal 29 is uncompressed video data, pixel data of which is output in sync with pixel clock. Therefore, in the case where the video data compression-coded using the MPEG-2 method and the like is transmitted, the video data is supplied to the HDMI transmission processing circuit 28 after the data is decoded from the compressed state in the moving picture data processing circuit 16.

The cable 1 connected to the HDMI terminal 29 includes the transmission line (transmission channel) for the control data in addition to the transmission line (transmission channel) for the video data, and the transmission line for the control data is configured such that the data transmission can be performed bidirectionally between the video output apparatus and the video input apparatus. Accordingly, the HDMI transmission processing circuit 28 functions as a control data I/O processing unit configured to input and output the control data, in addition to functioning as a video output processing unit configured to output the video data. The control data input through the cable 1 is sent to the system control CPU 20 and the control data to be output is supplied from the system control CPU 20.

The above-described contents list represents one of the control data that is output from the HDMI terminal 29. In the case where such data is output from the HDMI terminal 29, the data is output in response to a request from the other end connected through the HDMI terminal 29. Thumbnail image data is also output when the contents list data is output. The transmission processing on the contents list and thumbnail image data are described later in detail.

Figure 2:
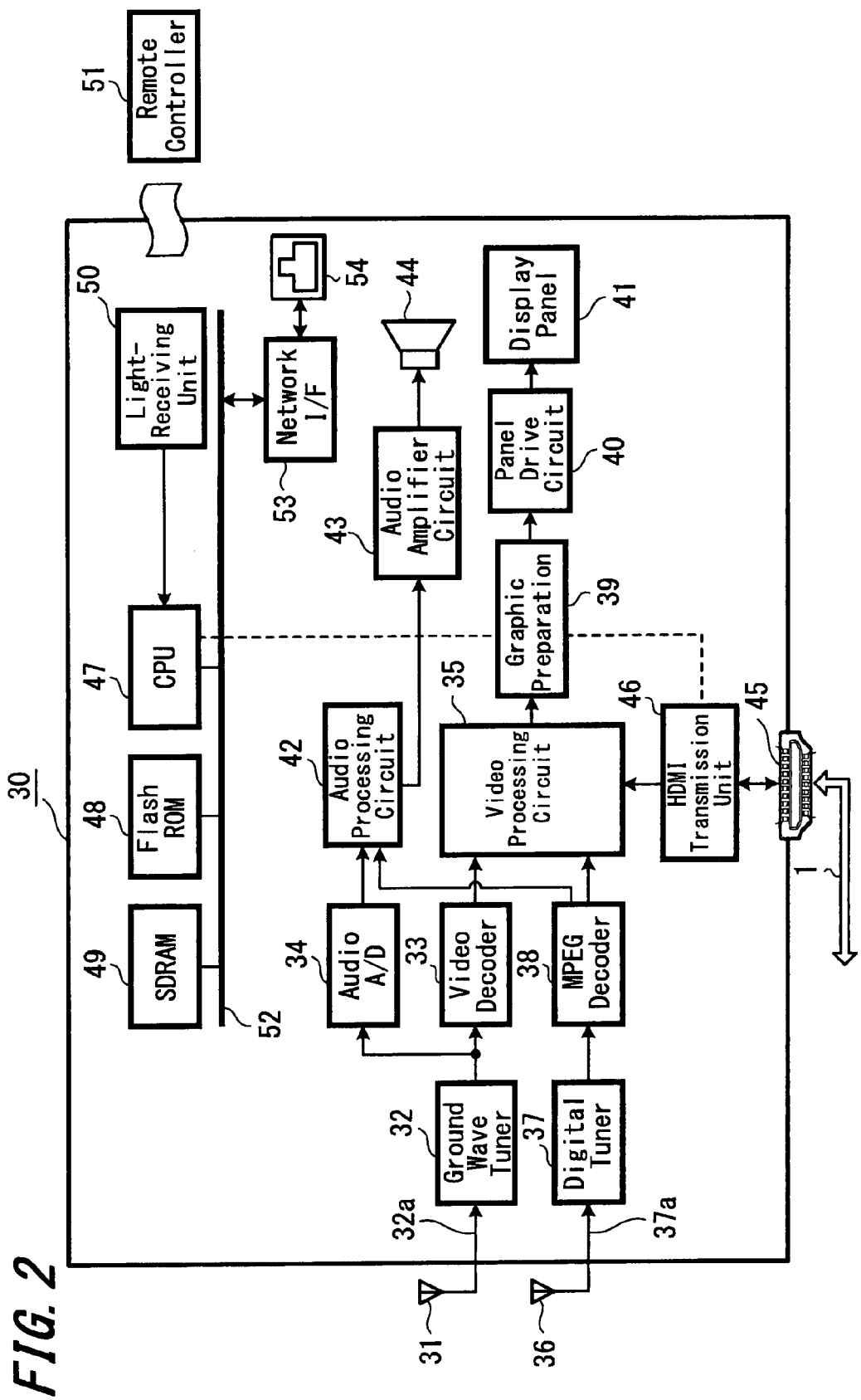
FIG. 2 is a block diagram showing an example of configuration of a sink device according to an embodiment of the present invention.

Next, referring to FIG. 2, configuration of a television receiver 30 that is the sink device connected to the video camera recorder 10 via the HDMI cable 1 is described. The television receiver 30 includes an antenna input terminal 32a for receiving analog broadcast, to which a ground wave antenna 31 is connected, and an antenna input terminal 37a for receiving digital broadcast, to which a digital broadcast reception antenna 36 is connected.

A ground wave analog tuner 32 demodulates a broadcast wave signal input from the ground wave analog broadcast antenna input terminal 32a, and video and audio signals of the broadcast wave signal are demodulated to basebands. A video decoder 33 converts thus received and obtained video signal into digital component data. An audio analog/digital converter 34 converts thus received and obtained audio signal into a digital signal.

A digital demodulation tuner 37 converts the broadcast wave signal input from the digital broadcast antenna input terminal 37a into a MPEG-TS stream. The MPEG-TS stream is supplied to a MPEG decoder 38 which converts the video data into digital component data and converts the audio data into digital audio data.

A video processing circuit 35 performs various processing on respective converted video data supplied thereto, and then supplies the result to a graphic preparation circuit 39. The graphic preparation circuit 39 prepares a graphic screen necessary for an operation in the television receiver 30 and superimposes the prepared screen on the video data or replaces the video data with the screen. A user interface screen such as the contents list is also prepared in the graphic preparation circuit 39. The video data output from the graphic preparation circuit 39 is supplied to a panel drive circuit 40. The panel drive circuit 40 drives a display panel 41 upon receiving the video data, so that the video is displayed on the display panel 41.

Further, an audio processing circuit 42 performs various audio processing on the converted audio data supplied thereto, and afterward supplies the processed audio data to an audio amplifier circuit 43 to adjust a volume to a necessary sound level and then outputs the result from a speaker 44.

A CPU 47 that controls the whole operation of the receiver controls various processing steps in the television receiver 30. Software (program) necessary for the control of the CPU 47 is stored in a flash ROM 48, and executed using a SDRAM 49. The CPU 47 and memories 48 and 49 are connected using an internal bus 52. The CPU 47 also controls the SDRAM 49 and flush ROM 48 to store the data input from the outside such as the contents list. The CPU 47 controls the stored date such as the contents list to be read, and controls the graphic preparation circuit 39 to prepare the user interface screen.

Further, the television receiver 30 according to the embodiment includes a light-receiving unit (receiving unit) 50 configured to receive a remote control signal. The light-receiving unit receives the remote control signal (infrared signal) sent from a remote controller 51 separately provided, and sends a control command indicated by the remote control signal to the CPU 47.

The television receiver 30 according to the embodiment further includes a HDMI terminal 45 and a network terminal 54 as external input terminals. The HDMI terminal 45 is provided to input video data of the baseband, and the like. A HDMI transmission unit 46 performs input processing on the input digital baseband data and supplies the video data to the video processing circuit 35 and supplies the audio data to the audio processing circuit 42. Those video and audio data are processed in the respective circuits 35 and 42 for video display and audio output.

The network terminal 54 is connected to a network such as Ethernet® and is connected to a network interface 53. The CPU 47 controls the network interface 53 to perform processing of transferring data to an external device connected via the network terminal 54.

Figure 3:
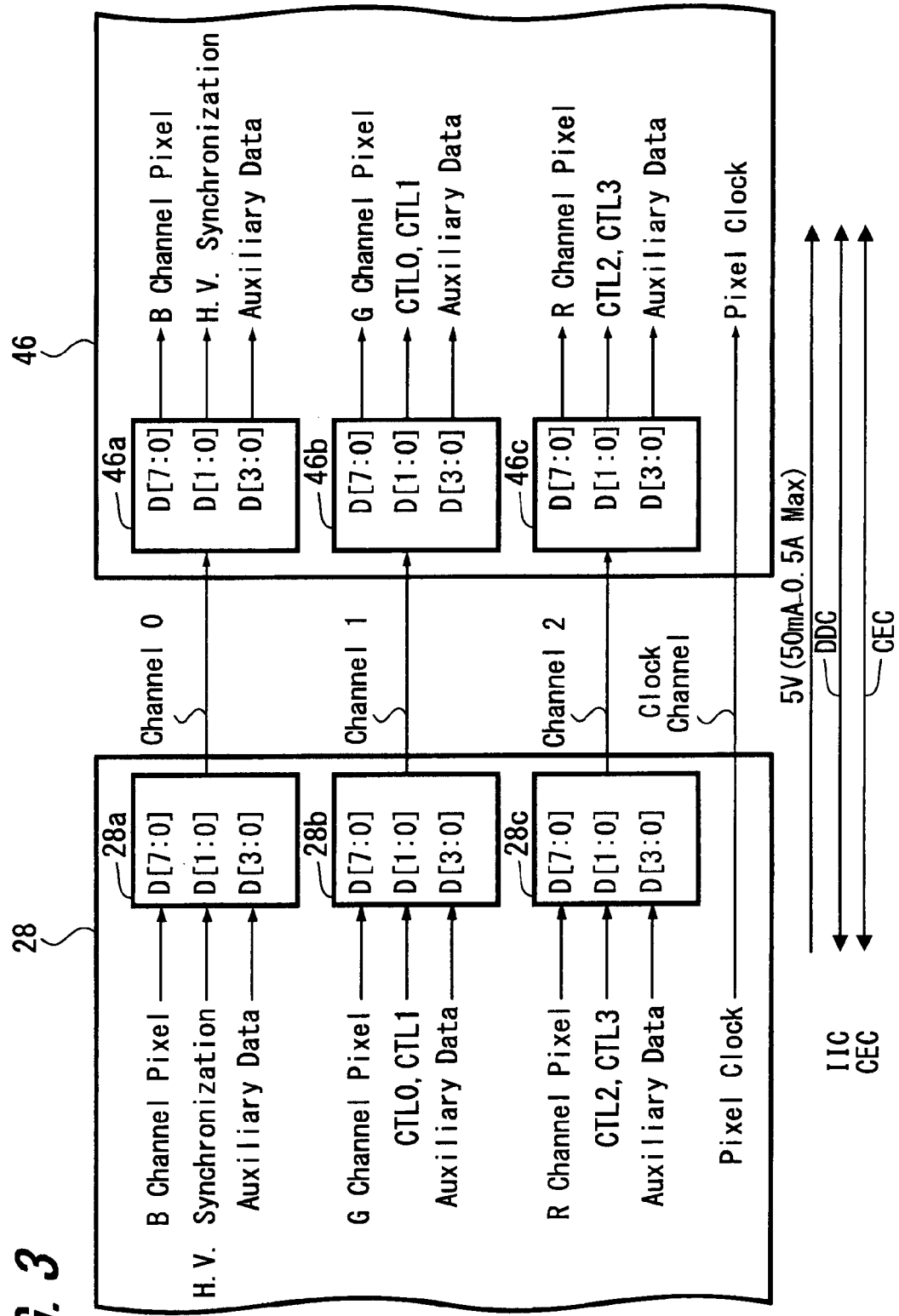
FIG. 3 is an explanatory diagram showing an example of configuration of transmission channels using a cable according to an embodiment of the present invention.

Next, referring to FIG. 3, there is explained an example of configuration of the data on respective channels transmitted using the HDMI cable 1 between the HDMI terminal 29 of the video camera recorder 10 and the HDMI terminal 45 of the television receiver 30. As shown in FIG. 3, three channels of channel 0, channel 1 and channel 2 are prepared in the HDMI standard, as channels to transmit the video data, and further a clock channel to transmit pixel clock is prepared. In addition, a power transmission line, DDC (Display Data Channel) line and CEC (Consumer Electronics Control) line as control data transmission channels are prepared. The DDC line is a data channel mainly used for the display control, and the CEC line is a data channel mainly used for controlling a device at the other end of the connected cable.

The HDMI transmission unit 28 on the transmission side (in the video camera recorder 10) includes data combining units 28a, 28b and 28c prepared for respective channels for transmitting video data, and the HDMI transmission unit 46 on the receiving side (in the television receiver 30) includes data separating units 46a, 46b and 46c prepared for respective channels for transmitting video data.

A configuration of each channel is herein explained. The channel 0 is configured such that pixel data of B-data (blue data), vertical synchronization data, horizontal synchronization data and auxiliary data are transmitted. The channel 1 is configured such that pixel data of G-data (green data), two kinds of control data (CTL0, CTL1) and auxiliary data are transmitted. The channel 2 is configured such that pixel data of R-data (red data), two kinds of control data (CTL2, CTL3) and auxiliary data are transmitted.

As the control data transmission channel, the CEC line performs bidirectional data transmission at a clock frequency lower than the channels (channels 0, 1 and 2) to transmit the video data. The CEC channel is used for later described request for the contents list and for the transmission of data in the contents list in response to the request.

Figure 4:
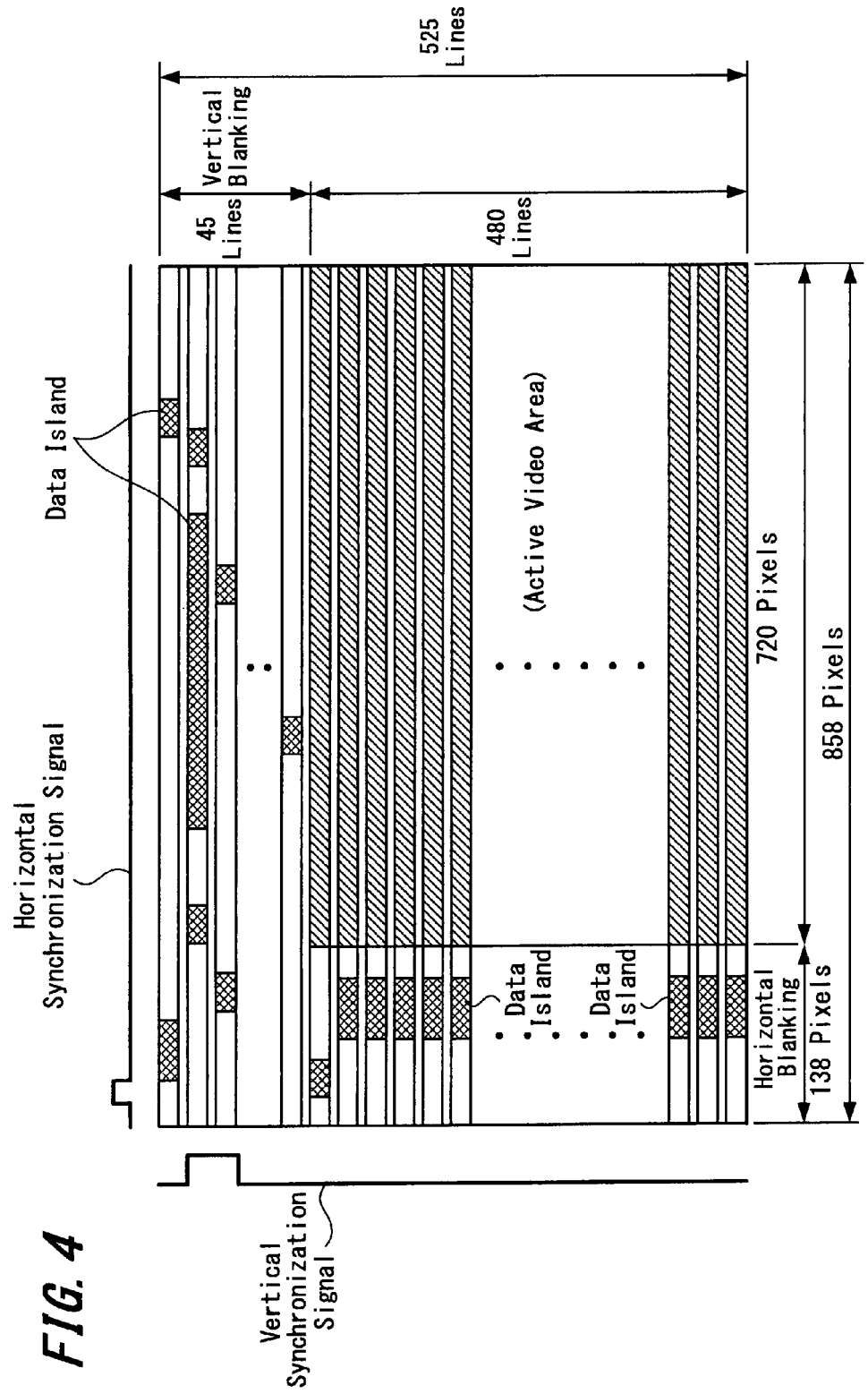
FIG. 4 is an explanatory diagram showing an example of configuration of video data when transmitting data using a cable according to an embodiment of the present invention.

FIG. 4 is a diagram showing a line configuration and a pixel configuration in one frame which is transmitted in the transmission according to the embodiment. The video data (main video data) transmitted in this embodiment is uncompressed data to which a vertical blanking period and a horizontal blanking period are added. Specifically, FIG. 4 shows an example of pixel data of 480 lines×720 pixels set as a video area displayed (shown as an active video area), and 525 lines× 858 pixels are set as the number of lines and pixels including the blanking periods, respectively. An area shown with double hatching (with left and right diagonal lines) in the blanking period is called a data island to which the auxiliary data can be added. In this embodiment, the thumbnail image data representing the index image data is transmitted using an interval of the data island.

Figure 5:
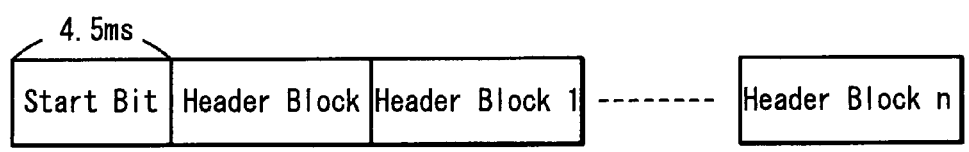
FIG. 5 is an explanatory diagram showing an example of configuration of CEC channel data according to an embodiment of the present invention.

Next, referring to FIGS. 5 through 8, a configuration of data that is transmitted on the CEC channel shown in FIG. 3 is explained. FIG. 5 is a diagram showing a block configuration of the data transmitted using the CEC channel. The CEC channel is configured such that one block is transmitted at 4.5 msec, in which a start bit is located at the start of the data transmission, subsequently a header block is arranged, and afterward an arbitrary number of data blocks (n blocks in FIG. 5: n is an arbitrary integer) including data intended to actually transmit are arranged.

Figure 6:
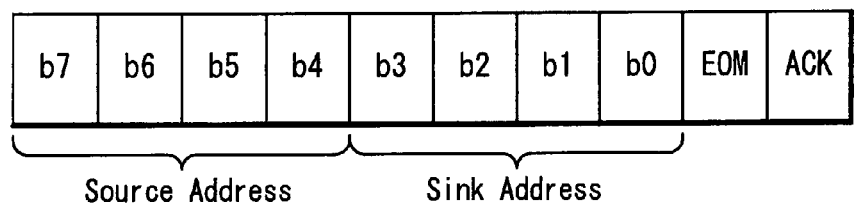
FIG. 6 is an explanatory diagram showing an example of configuration of CEC channel header according to an embodiment of the present invention.

FIG. 6 is a diagram showing an example of a data structure of the header block. An address of the source device and an address of the sink device are arranged in the header block. Respective addresses are set correspondingly to the kind of device.

FIG. 7 shows an example of the address that is set correspondingly to the kind of device. As shown in FIG. 7, sixteen kinds of addresses from "0" to "15" are set for respective devices, and values for the addresses of those sixteen kinds are set correspondingly to respective devices. The address value is arranged as four bit values of the source address and sink address shown in FIG. 6. In the case where the video camera recorder 10 and the television receiver 30 respectively shown in FIGS. 1 and 2, for example, are connected using the HDMI cable 1, the source address is "10" indicating the video camera and the sink address is "0" indicating the television receiver (TV).

Also, commands shown in FIG. 8 are prepared beforehand when the control command is transmitted using the CEC channel. Although not illustrated in FIG. 8, values are predetermined to respective commands, and the receiving side detects the value to determine an instruction of the transmitted command. Here, only the control commands related to the control of the video camera recorder are shown.

<give Contents List> is the command to request the transmission of the contents list. A device receiving the command sends back the command of <set Contents Number>, which is described next, as a response.

<set Contents Number> is the command to inform the number of contents in the contents list retained in the receiving device.

<set Content Info> is the command to transmit the data of the contents list.

<Thumbnail ID> is the command to inform ID (Identification Number) when transmitting the thumbnail image.

<Play Content> is the command to instruct a device to reproduce the content. Upon receiving the command, a response indicating a device state (whether entering a reproduction state or not) is sent back.

<Image View On> is the command to inform that the device is in the reproduction state.

FIG. 9 is a diagram showing an example of a data structure of a header when the thumbnail image data is transmitted. FIG. 9 shows the data structure using eight bits as a unit. Packet type data is arranged in the first eight bits and indicates that the data is the thumbnail image. Content number data is arranged in the next eight bits and indicates the content corresponding to the thumbnail image. A data length of the thumbnail image is indicated in the subsequent eight bits. Subsequently, the thumbnail image data is arranged following the header. The thumbnail image data may be image data (still image data) on which some compression processing is performed. The thumbnail image data shown in FIG. 9 is arranged sequentially at intervals of the data islands prepared in the vertical blanking period and horizontal blanking period of the video data shown in FIG. 4, for example.

Next, referring to FIG. 10, there is described a state in which the data transmission is performed using the HDMI cable 1 between the HDMI terminal 29 in the video camera recorder 10 and the HDMI terminal 45 in the television receiver 30 according to the embodiment. In this example, a user operates the remote controller 51 (see FIG. 2) for the television receiver 30 and allows the video camera recorder 10 to transfer the list (contents list) of the video contents recorded in the recording medium 19. Subsequently, the user allows the list to be displayed on the television receiver 30, and the content selected by the user based on the display of the list is reproduced in the video camera recorder 10 and is displayed on the television receiver 30.

First, the user operates the keys arranged on the remote controller 51 to display a menu screen on the television receiver 30 (step S11). The menu screen is prepared in the graphic preparation unit 39 with the control of the CPU 47 in the television receiver 30. With a user operation on the displayed menu screen to select and obtain the contents list of the device connected to the HDMI terminal 45, the CPU 47 uses the CEC channel in the transmission line using the HDMI cable 1 and sends the command to the video camera recorder 10 that is the device connected through the HDMI terminal 45 (step S12). The command transmitted at the time is <give Contents List> that is the request for transmitting the contents list.

Upon detecting the reception of the command with the CPU 20 in the video camera recorder 10, the CPU 20 sends back the number of contents indicated in the contents list prepared in the video camera recorder 10 (step S13). The command transmitted at the time is <set Contents Number> to inform the number of contents, with the data on the number of contents added thereto. Following the transmission of the number of contents, the CPU 20 transmits <set Content Info> to transmit the contents list data (step S14), and data with the ID added to <Thumbnail ID> to inform the ID of the thumbnail image is transmitted subsequently to the command (step S15). While <set Content Info> command and <Thumbnail ID> command are being transmitted using the CEC channel, the video data, in which the thumbnail image with the above-described ID given thereto is arranged in the interval of the data island prepared in respective blanking periods, is transmitted using the transmission channels (channels 0, 1 and 2: FIG. 3) for the video data.

Figure 11A:
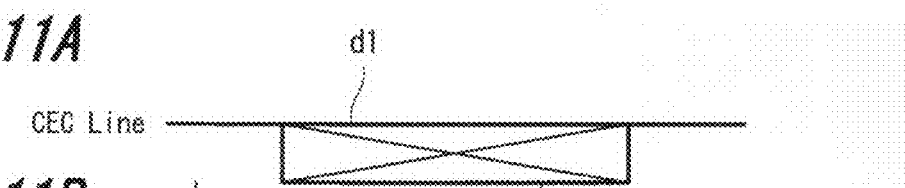
FIGS. 11A and 11B are timing charts showing an example of processing thumbnail data according to an embodiment of the present invention.
Figure 11B:
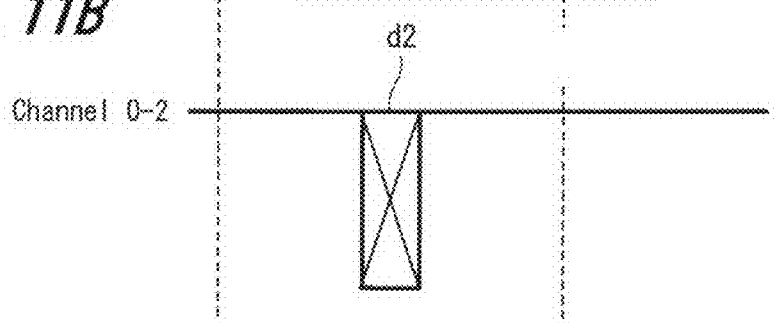

Specifically, as shown in FIG. 11A, for example, while the control data d1 including <set Content Info> command and <Thumbnail ID> command is being transmitted using the CEC line, the video data in which thumbnail image data d2 having the above-described ID given thereto is arranged in the data island period of the channels 0, 1 and 2 is transmitted. Here, if the recording operation, the reproduction operation of the content, and the like are not performed in the video camera recorder 10 according to the embodiment but the sink device is connected to the HDMI terminal 29, such video data as a white screen or the like is output from the terminal 29 and the thumbnail image data and the like are added to the blanking period of the video data.

Returning to the explanation of FIG. 10, the commands of <set Content Info> and <Thumbnail ID>, and the thumbnail image data in the data island interval are set as a data transmission unit, and the data transmission unit is repeated correspondingly to the number of contents informed in the command of <set Content Number> so that the thumbnail image of each video content and the like are transmitted. More specifically, the data of the content of the last unit is transmitted at steps S16 and S17 in the example of FIG. 10.

The data of the contents list and the thumbnail image data of each video content in the contents list are transmitted. The CPU 47 stores the received data in the memory 49 and the like; prepares the corresponding contents list display screen in the graphic preparation unit 39 based on the stored data; and displays the prepared contents list display screen on the display panel 41 (step S18). The user confirms the display and performs an operation of selecting any one of the video contents in the contents list (step S19). Accordingly, the CPU 47 in the television receiver 30 detects the operation command and transmits <Play Content> command to instruct the video camera recorder 10 to reproduce the relevant content with the content number added to the command (step S20). The CPU 20 in the video camera recorder 10 having received the reproduction command controls the relevant video content to be reproduced from the recording medium 19, and outputs the data of the reproduced video content to be transmitted from the HDMI terminal 29 to the television receiver 30 (step S21). The video data transmission channels 0, 1 and 2 are used for the transmission of the data of the video content, and the uncompressed data is transmitted.

When the transmission of the reproduction video data is started, video display processing and audio output processing, both of which are input via the HDMI terminal 45, is performed in the television receiver 30 so that the reproduction processing on the video content is performed (step S22).

Figure 12:
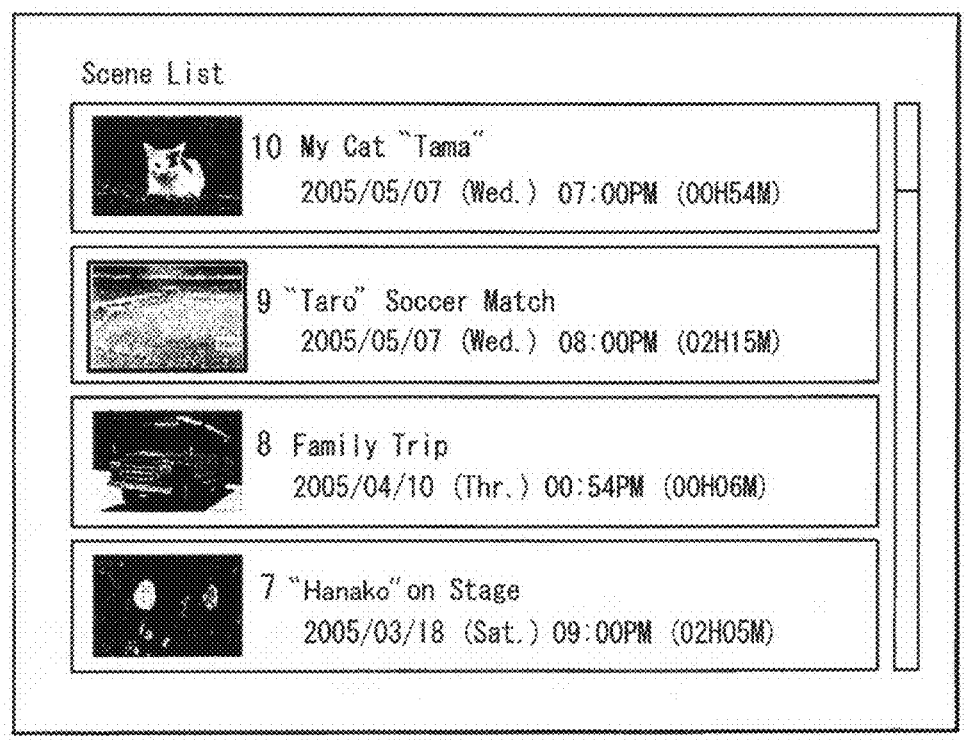
FIG. 12 is an explanatory diagram showing a display example of a title list according to an embodiment of the present invention.

FIG. 12 is a diagram showing a display example of the contents list in the television receiver 30. In this example, four titles are displayed on one screen, and the thumbnail image is displayed at the side of each title. The display tiles can be changed by a scroll operation on the screen, for example. In addition to the thumbnail image, the additional information such as recording date and time, a length of the content (recording time), and the like is displayed in a display area for each title. The user selects the video content to be reproduced by referring to the title and thumbnail image in such display, and performs an operation of reproducing the selected video.

According to the embodiment as described above, the contents list prepared in the video camera recorder 10 can be transmitted to the television receiver 30 and further the thumbnail image (index image) added to the contents in the list can also be transmitted only by connecting the video camera recorder 10 and the television receiver 30 through a set of transmission lines (HDMI cable) to transmit the video data and the audio data. Accordingly, such list as shown in FIG. 12 can be displayed on the television receiver 30 based on the received list and thumbnail image. Therefore, the user can recognize the contents of the video and the like recorded in the recording medium 19 in the video camera recorder 10 without operating the video camera recorder 10, and can reproduce the necessary video content in the video camera recorder 10 to be displayed. In this regard, since such list display screen as shown in FIG. 12 is prepared in the television receiver, it may be necessary for the video camera recorder 10 to prepare the contents list or the like alone in advance and there is no need for the video camera recorder 10 to prepare the contents list display screen. As a result, the video camera recorder 10 may not require complicated configuration and processing, which is also convenient for the user, since the actual operation can be performed using the remote controller 51 provided with the television receiver 30.

It should be noted that the command configuration and the like explained in the above-described embodiment represents an example, and the embodiment of the present invention is not limited to this example. In addition, the thumbnail image (index image) is transmitted during the blanking period in the video data transmission line in the above-described embodiment, but may be transmitted during a period other than the blanking period. For example, the thumbnail image may be transmitted using the CEC line or DDC line that is prepared in conformity with the HDMI standard.

In addition, the HDMI standard interface is used in the above-described embodiment as the transmission channel connecting the source device and the sink device, but the embodiment of this invention can also be applied to other similar standards. Further, the video camera recorder is used as the source device and the television receiver is used as the sink device in the above-described embodiment, but other video output apparatuses and video input apparatuses may also be used.

It should be understood by those skilled in the art that various modifications, combinations, sub-combinations and alterations may occur depending on design requirements and other factors insofar as they are within the scope of the appended claims or the equivalents thereof.

The invention claimed is:
1. A communication system comprising:
a source device to output video contents and
a sink device to input the video contents, connected to the source device using a control transmission channel and a video transmission channel through which data is transmitted,
the source device including
a first control data I/O unit configured to input and output control data through the control transmission channel;
a first video data output unit configured to output video data through the video transmission channel;

a video data retention unit configured to retain the video data capable of being output from the first video data output unit;

a contents list retention unit configured to retain a contents list of the video data retained in the video data retention unit;

an index image data retention unit configured to retain index image data of the video data retained in the video data retention unit; and a first control unit configured to control the first control data I/O unit to output the contents list retained in the contents list retention unit to the control transmission channel, and configured to control the first video data output unit to output the index image data retained in the index image data retention unit to the video transmission channel during a blanking period of the video data, in response to a request input into the first control data I/O unit, and the sink device including a second control data I/O unit configured to input and output control data through the control transmission channel;

a second video data input unit configured to input video data through the video transmission channel;

a video processing unit configured to process the video data input into the second video data input unit; and a second control unit configured to control the second control data I/O unit to output a request for the contents list, configured to control the video processing unit to perform display processing on the contents list input upon the request, configured to control the video processing unit to perform display processing on the index image data input into the second video data input unit, and configured to control the second control data I/O unit to output a transmission request of selected content in the case of selecting the content based on display, wherein the request is output to the source device on a consumer electronics control line of a high definition multimedia interface and the index image data is output to the sink device on a channel line of the high definition multimedia interface, wherein, during the time that the index image data is output to the sink device on the channel line of the high definition multimedia interface, identification information corresponding to the index image data is output to the sink device on the consumer electronics control line of the high definition multimedia interface, wherein the source device is not operable to generate a display contents list that includes the index image data and respective contents list data, and the sink device is operable to generate a display contents list that includes the index image data and respective contents list data.

2. A communication method of transmitting and receiving data between a source device to output video contents and a sink device to input the video contents connected using a control transmission channel and a video transmission channel through which data is transmitted, comprising:

transmitting a list of video contents capable of being output from the source device to the sink device through the control transmission channel in response to a request from the sink device to the source device, transmitting index image data of each content in the contents list to the sink device through the video transmission channel during a blanking period of the video data, displaying the contents list and index image input into the sink device and selecting video content transmitted from the source device, wherein the request is output to the source device on a consumer electronics control line of a high definition multimedia interface and the index image data is output to the sink device on a channel line of the high definition multimedia interface, wherein, during the time that the index image data is output to the sink device on the channel line of the high definition multimedia interface, identification information corresponding to the index image data is output to the sink device on the consumer electronics control line of the high definition multimedia interface, wherein the source device is not operable to generate a display contents list that includes the index image data and respective contents list data, and the sink device is operable to generate a display contents list that includes the index image data and respective contents list data.

3. A video output apparatus connected to a sink device to input video contents using a control transmission channel and a video transmission channel, comprising:

a control data I/O unit configured to input and output control data through the control transmission channel;

a video data output unit configured to output video data through the video transmission channel;

a video data retention unit configured to retain video data capable of being output from the video data output unit;

a contents list retention unit configured to retain a contents list of the video data retained in the video data retention unit;

an index image data retention unit configured to retain index image data of the video data retained in the video data retention unit; and a control unit configured to control the control data I/O unit to output the contents list retained in the contents list retention unit to the control transmission channel, and configured to control the video data output unit to output the index image data retained in the index image data retention unit to the video transmission channel during a blanking period of the video data, in response to a request input into the control data I/O unit, wherein the request is output to the source device on a consumer electronics control line of a high definition multimedia interface and the index image data is output to the sink device on a channel line of the high definition multimedia interface, wherein, during the time that the index image data is output to the sink device on the channel line of the high definition multimedia interface, identification information corresponding to the index image data is output to the sink device on the consumer electronics control line of the high definition multimedia interface, wherein the source device is not operable to generate a display contents list that includes the index image data and respective contents list data, and the sink device is operable to generate a display contents list that includes the index image data and respective contents list data.

4. A video output apparatus according to claim 3, wherein in the case where a request specifying a certain video content in the contents list is input into the control data I/O unit, the control unit controls the video data retention unit to output the video content and controls the video data output unit to output the video content to the video transmission channel.

5. A video output apparatus according to claim 3, wherein the index image data output from the video data output unit has a limited amount of data so as to be arranged in the blanking period to be transmitted.

6. A video output apparatus according to claim 3, wherein the contents list is output from the control data I/O unit in sync with the index image data being output from the video data output unit.

7. A video output apparatus according to claim 3, wherein the contents list is arranged in the blanking period of the video data, being output from the video data output unit to the video transmission channel instead of the control transmission channel.

8. A video input apparatus connected to a source device to output video contents using a control transmission channel and a video transmission channel, comprising:

a control data I/O unit configured to input and output control data through the control transmission channel;

a video data input unit configured to input video data through the video transmission channel;

a video processing unit configured to process the video data input into the video data input unit; and a control unit configured to control the control data I/O unit to output a request for the contents list, configured to control the video processing unit to perform display processing on the contents list input upon the request, configured to control the video processing unit to perform display processing on the index image data input into the video data input unit, and configured to control the control data I/O unit to output a transmission request of selected content in the case of selecting the content based on display, wherein the request is output to the source device on a consumer electronics control line of a high definition multimedia interface and the index image data is output to the apparatus on a channel line of the high definition multimedia interface, wherein, during the time that the index image data is output to the sink device on the channel line of the high definition multimedia interface, identification information corresponding to the index image data is output to the sink device on the consumer electronics control line of the high definition multimedia interface, wherein the source device is not operable to generate a display contents list that includes the index image data and respective contents list data, and the sink device is operable to generate a display contents list that includes the index image data and respective contents list data.

9. A video input apparatus according to claim 8, wherein the index image data input from the video data input unit is the data separated from a blanking period of the video data.

10. A video input apparatus according to claim 8, wherein the index image data input from the video data input unit is received in sync with the contents list input from the control data I/O unit, and a correspondence between data in the contents list and the index image data is detected.

11. A video input apparatus according to claim 8, wherein the contents list is retrieved from the blanking period of the video data input from the video data input unit.

* * * * *